US00RE43464E

(19) United States
(12) Reissued Patent
Gold et al.

(10) Patent Number: US RE43,464 E
(45) Date of Reissued Patent: Jun. 12, 2012

(54) HIGH INTENSITY LASER OR DIODE-BASED LIGHTING APPARATUS HAVING INTEGRATED OPTICS

(75) Inventors: Martin A. Gold, Gainesville, FL (US); Stanley Kaye, Gainesville, FL (US)

(73) Assignee: University of Florida Research Foundation, Incorporated, Gainesville, FL (US)

(21) Appl. No.: 12/917,693

(22) Filed: Nov. 2, 2010

Related U.S. Patent Documents

Reissue of:

(64) Patent No.: 7,545,584
Issued: Jun. 9, 2009
Appl. No.: 11/722,945
PCT Filed: Dec. 29, 2005
PCT No.: PCT/US2005/047426
§ 371 (c)(1),
(2), (4) Date: May 1, 2008
PCT Pub. No.: WO2006/071986
PCT Pub. Date: Jul. 6, 2006

U.S. Applications:

(60) Provisional application No. 60/640,075, filed on Dec. 29, 2004.

(51) Int. Cl.
*G02B 17/00* (2006.01)

(52) U.S. Cl. ..... 359/727; 359/618; 359/627; 359/726; 362/235; 362/240; 362/244; 385/33; 385/47

(58) Field of Classification Search ..... 359/618, 359/627, 726, 727; 362/235, 240, 244; 385/33, 385/47; 372/93, 94, 98–101, 108
See application file for complete search history.

(56) References Cited

U.S. PATENT DOCUMENTS

| | | | | |
|---|---|---|---|---|
| 4,743,091 | A | 5/1988 | Gelbart et al. | |
| 5,485,317 | A | 1/1996 | Perissinotto et al. | |
| 5,865,529 | A * | 2/1999 | Yan | 362/327 |
| 6,371,637 | B1 | 4/2002 | Atchinson | |
| 6,683,423 | B2 | 1/2004 | Cunningham | |
| 2003/0235800 | A1 * | 12/2003 | Qadar | 433/29 |

* cited by examiner

*Primary Examiner* — Joseph P Martinez
(74) *Attorney, Agent, or Firm* — Saliwanchik, Lloyd & Eisenschenk

(57) ABSTRACT

A high intensity lighting apparatus (400) includes an outer housing (402); a curved support disk (414) having an array of diode or laser-based integrated light sources (410) attached thereto disposed within the housing. Each of the light sources (110) include a tube (112) having a laser or diode chip (111) at one end of the tube. The tubes each have at least one concave shaped exit surface (113) on an end opposite the chip, wherein the concave exit surface converges light emitted from each of the light sources to focal points within the housing (402). A shape of the curved support disk (414) converges the respective focal points into a light beam having a common focal plane (441). Adjustable secondary optics (431) are disposed in the housing after the focal plane (441) for creating various angles of transmission of the light beam. The laser can be a diode laser, while the diode can be a light-emitting diode (LED).

19 Claims, 4 Drawing Sheets

HIGH INTENSITY LASER OR DIODE-BASED LIGHTING APPARATUS HAVING INTEGRATED OPTICS

Matter enclosed in heavy brackets [ ] appears in the original patent but forms no part of this reissue specification; matter printed in italics indicates the additions made by reissue.

CROSS-REFERENCE TO RELATED APPLICATIONS

This application is the national stage entry of International Application No. PCT/US2005/047426, filed Dec. 29, 2005, which claims priority to U.S. Provisional Patent Application No. 60/640,075, filed Dec. 29, 2004.

FIELD OF THE INVENTION

The invention relates to lighting fixtures and, more particularly, to a high intensity lighting apparatus including an array of integrated light sources mounted on a support disk, where the integrated light sources are disposed inside tubes which include exit surfaces shaped to provide focusing optics. A shape of the curved support disk converges the respective focal points into a light beam having a common focal plane.

BACKGROUND OF THE INVENTION

Lighting fixtures have been used for many years in a variety of applications including theater and television lighting applications. Typically, each fixture includes an incandescent lamp mounted adjacent to a concave reflector, which reflects light through a lens assembly to project a beam of light toward a theater stage. A color filter can be mounted at the fixture's forward end, for transmitting only selected wavelengths of the light emitted by the lamp, while absorbing and/or reflecting other wavelengths. This provides the projected beam with a particular color composition.

The color filters used in these lighting fixtures typically have the form of glass or plastic films, carrying a dispersed chemical dye. The dyes transmit certain wavelengths of light, but absorb the other wavelengths. Several hundred different colors can be provided by such filters.

Although generally effective, such plastic color filters usually have limited lifetimes, caused principally by the need to dissipate large amounts of heat derived from the absorbed wavelengths. This has been a particular problem for filters transmitting blue and green wavelengths. Further, although the variety of colors that can be provided is large, these colors nevertheless are limited by the availability of commercial dyes and the compatibility of those dyes with the glass or plastic substrates. In addition, the mechanism of absorbing non-selected wavelengths is inherently inefficient. Substantial energy is lost to heat.

In some lighting applications, gas discharge lamps have been substituted for the incandescent lamps, and dichroic filters have been substituted for the color filters. Such dichroic filters typically have the form of a glass substrate carrying a multi-layer dichroic coating, which reflects certain wavelengths and transmits the remaining wavelengths. These alternative lighting fixtures generally have improved efficiency, and their dichroic filters are not subject to fading or other degradation caused by overheating. However, the dichroic filters offer only limited control of color, and the fixtures cannot replicate many of the complex colors created by the absorptive filters that have been accepted as industry standards.

It is sometimes necessary to change the color of the light being produced by a particular lighting fixture, so several remotely operated color-changing devices have been developed in recent years. One such device is a color scroller, which includes a scroll typically containing 16 preselected filters. These filters are subject to the same problems of fading and deformation as are the individual filters. Another such device is a dichroic color wheel, which includes a rotatable wheel carrying about eight preselected dichroic coatings. These color wheels avoid the noted problems of fading and deformation, but are able to carry fewer colors and are substantially more expensive than is a color scroller.

Other such remotely operated color-changing devices include a cyan, magenta & yellow (CMY) filter scroller system and a CMY dichroic color mixing system, the latter of which can provide about 16 million combinations of separate colors. However, because both CMY systems use filters that each transmit only about one third of the visible spectrum, they are unable to replicate the spectral nuances of a complex color, including those produced by a conventional color filter in combination with a full-spectrum incandescent light source.

Other remotely operated color-changing devices include an incandescent RGB fixture, such as a theatrical strip light. Such fixtures have similar problems to those of the two CMY systems described briefly above. In such fixtures, one-third of the visible spectrum is provided by each of three separately filtered lid sources. Thus, these fixtures waste two-thirds of the light energy just to project white light, and they waste even more light energy when projecting colored light.

Recently, some lighting fixtures have begun using light-emitting diodes (LEDs) instead of incandescent lamps and gas-discharge lamps. Equal quantities of red-, green-, and blue-colored LEDs typically have been used, arranged in a suitable array. Some LED fixtures have further included an equal quantity of amber-colored LEDs. By providing electrical power in selected amounts to these LEDs, typically using pulse-width modulated electrical current, light having a variety of colors can be projected. These fixtures eliminate the need for color filters, thereby improving on the efficiency of prior fixtures incorporating incandescent lamps or gas-discharge lamps.

Lighting fixtures incorporating red-, green-, and blue-colored LEDs, i.e., RGB LED fixtures, can project beams of light having an apparent color of white, especially when illuminating a white or other fully reflective surface. However, the actual spectrum of this apparent white color is not at all the same as that of the white light provided by fixtures incorporating incandescent lamps. This is because LEDs emit light in narrow wavelength bands, and merely three different LED colors are insufficient to cover the full visible spectrum. Colored objects illuminated by such RGB LED fixtures frequently do not appear in their true colors. For example, an object that reflects only yellow light, and thus that appears to be yellow when illuminated with white light, will appear black when illuminated with light having an apparent yellow color, produced by the red and green LEDs of an RGB LED fixture. Such fixtures, therefore, are considered to provide poor color rendition when illuminating a setting such as a theater stage, television set, building interior, or display window.

A limited number of LED lighting fixtures have included not only LEDs emitting red, green, and blue light, but also LEDs emitting amber light. Such fixtures are sometimes called RGBA LED fixtures. These fixtures are subject to the same drawbacks as are RGB LED fixtures, but to a slightly reduced degree.

Such LED lighting fixtures also generally require post-LED lens strategies for focusing. The optics are thus spaced apart from LED sources and thus render the system more expensive as well as require alignment of the optics to the light sources. Moreover, power levels attainable limit the applicability of the post LED lens approach. A new more efficient light concentration approach is needed to move the LED to the levels of output required for theater (theatrical illuminator) and other high intensity beam applications (such as automotive headlamps).

SUMMARY

A high intensity lighting apparatus includes an outer housing, a curved support disk having an array of diode or laser-based integrated light sources attached thereto disposed within the housing. Each of the light sources include a tube having a laser or diode chip at one end of the tube. The tubes each have at least one concave shaped exit surface on an end opposite the chip, wherein the concave exit surface converges light emitted from each of the light sources to focal points within the housing. A shape of the curved support disk converges the respective focal points into a light beam having a common focal plane (referred to as a gate). Adjustable secondary optics are disposed in the housing after the gate for creating various angles of transmission of the light beam. The laser can be a diode laser, while the diode can be a light-emitting diode (LED).

The focal plane (gate) can be concentrated to substantially a single common focal point. In one embodiment, the tubes include a highly reflective surface coating an inside of said tubes excluding said the exit surface. The chips can be side emitting chip mounted in a rotated configuration in the tube. In another embodiment, the chip is triangular shaped and side emitting. in another embodiment, the chip has ports for allowing light to escape from various points on a side of the chip. In yet another embodiment, the exit surface provides at least two different focusing planes.

The support disk can be a malleable armature that flexes to change a beam spread of the array. In a preferred embodiment, the array of light sources is removably coupled to the support disc.

BRIEF DESCRIPTION OF THE DRAWINGS

A better understanding of the present invention can be obtained when the following detailed description is considered in conjunction with the following drawings in which.

DETAILED DESCRIPTION

Figure 1A:
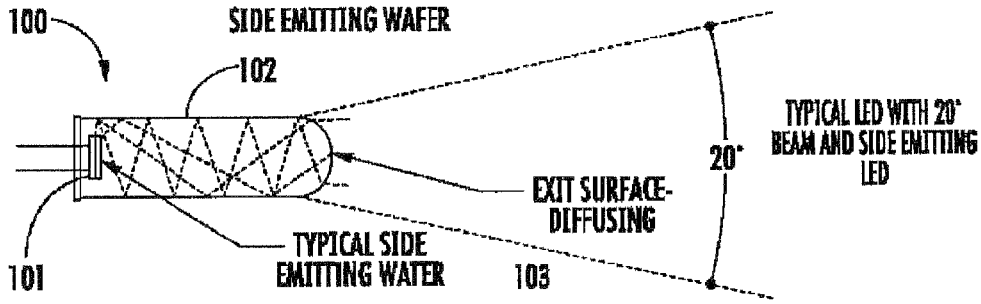
FIG. 1(a) shows a conventional LED where the LED die is side emitting. The exit surface of the tube is diffusing.

A high intensity lighting apparatus includes an outer housing, a curved support disk having an array of diode or laser-based integrated light sources attached thereto disposed within the housing. Each of the light sources include a tube having a laser or diode chip at one end of the tube. The tubes each have at least one concave shaped exit surface on an end opposite the chip, wherein the concave exit surface converges light emitted from each of the light sources to focal points within the housing. A shape of the curved support disk converges the respective focal points into a light beam having a common focal plane (referred to as a gate). Adjustable secondary optics are disposed in the housing after the gate for creating various angles of transmission of the light beam. The laser can be a diode laser, while the diode can be a light-emitting diode (LED).

The invention thus provides a high intensity lighting apparatus (e.g. spotlight) in miniature using an array of diode laser or LED die as the light source and then transmitting the concentrated light to the gate of the apparatus where it is converged before it passes to the secondary lens. As a result, the invention concentrates the light twice, once at the individual LED or diode laser level, and then again at the gate before it passes to the secondary lens. In contrast to conventional spotlights which generate large amounts of heat build up at the gate due to the concentration of the light, the invention minimizes heat produced at the gate due to the limited amount of infra-red light provided by the LED or diode laser array. The invention thus allows for new types of projection technologies.

A diode laser, also referred to as a laser diode, may also be used with the invention. The laser diode includes a resonant high Q cavity. With sufficient feedback, laser action results. Most laser diodes have the cavity built right into the device but in some arrangements an external cavity can be used. When a device is referred to as a "laser diode", this generally refers to the combination of the semiconductor chip that does the actual lasing along with a monitor photodiode chip which provides feedback control of power output. These are then mounted and may be combined with driver circuitry and optics in a diode laser module.

The high Q cavity of the diode laser cuts down drastically the number of modes operating. The result is that the emission line narrows drastically (more monochromatic) and the beam narrows somewhat spatially as compared to an LED.

A LED emits photons from recombining electrons in the junction region. LEDs generally have a very broad spectrum, but unlike diode lasers do not require control electronics making them the generally preferred light source.

The lighting apparatus generally comprises a support disk, where the light source array is mounted on the disk. The disk preferably has a concave geometry, a slope of the concave geometry concentrating light emitted from the plurality of lamps. The concave geometry of the disk can be fixed, or the geometry maleable and dynamically shapeable based on control techniques known in the art. The invention thus combines integrated chip-based light sources with lens optics provided by the tubes themselves to realize sophisticated control on a light beam that allows focusing (hard edge beams or soft edge beams).

FIG. 1(a) shows a conventional LED 100 where the LED die 101 is side emitting. The tube 102 provides a reflective surface for the emitted light and an exit surface 103 on the distal end opposite the LED chip 101. The exit surface 103 does not include not focusing optics. As a result, the exit surface 103 diffuses the light emitted by LED die 101 at an angle of about 20 degrees.

Figure 1B:
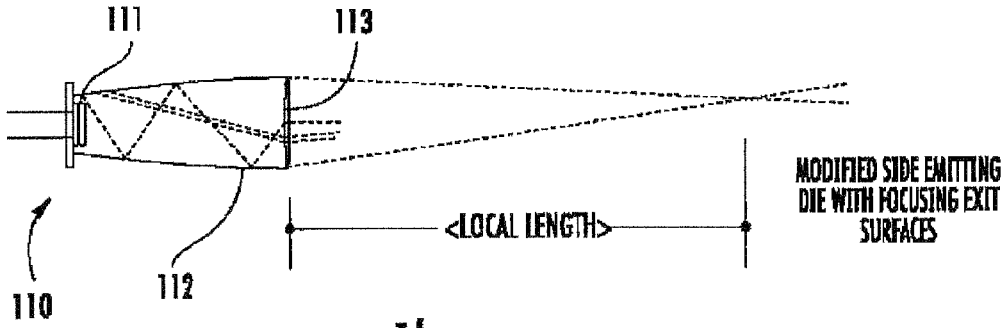
FIGS. 1(b)-(c) show inventive embodiments of light emitting diode (LED) sources including a tube lens having a diode chip at one end of the tube. The tube lens provides a focusing exit surface that converges light emitted from the LED to a focal point/spot.

In a first inventive embodiment shown in FIG. 1(b), LED 110 includes a tube 112 which provides a concave exit surface 113 that focuses and thus converges light emitted by the LED die 111 to a focal point at a particular focal length. The focal length can be changed based on the focusing optics selected. In one embodiment, focusing optics can be removably attached to the tube 112 to allow the exit surfaces to be changed, if desired.

Figure 1C:
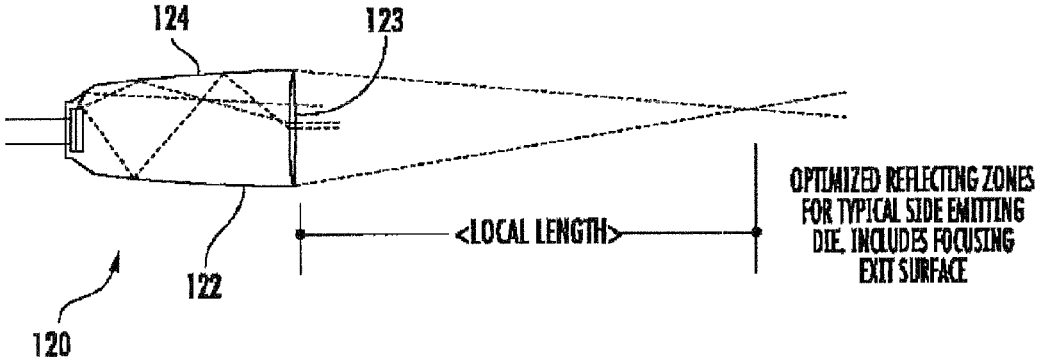

FIG. 1(c) shows an LED 120 according to another embodiment of the invention which includes an optimized reflecting surface 124 lining the inside of the tube 122 in addition to the focusing optics shown in FIG. 1(b). The tube can also have contouring to direct the emitted light from the die/cup to internal planes that direct the light at angles that can then be converged by the lens at the front of the tube. The reflecting surface 124 can comprise an aluminum coating, which is omitted from the focusing exit surface 123.

Figure 2A:
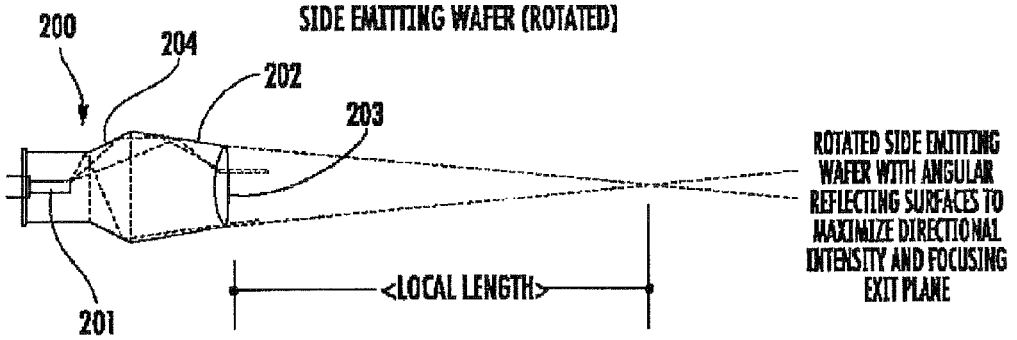
FIGS. 2(a)-(c) show various exemplary side emitting chip configurations for the light sources having reflecting zones and a focusing exit plane.
Figure 2B:
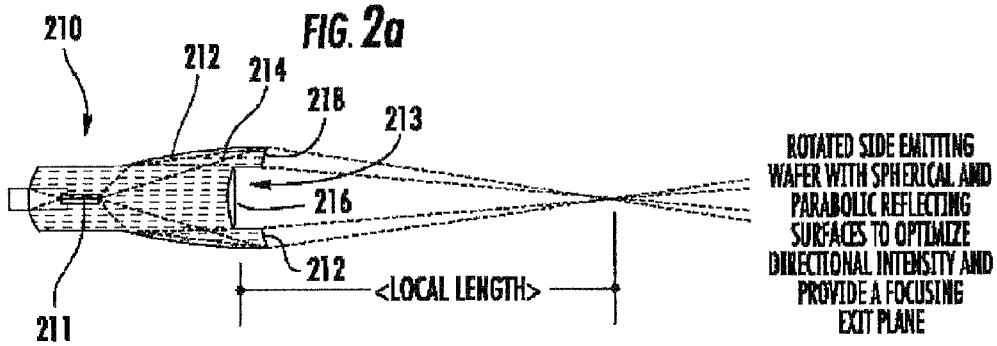
Figure 2C:
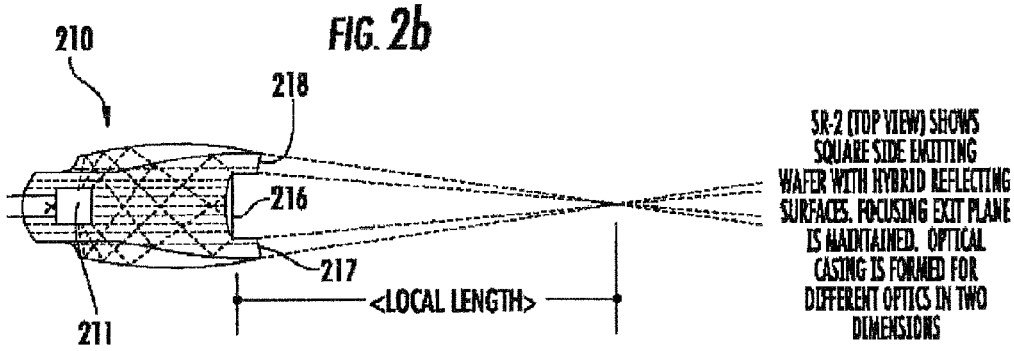

FIGS. 2(a)-(c) show various exemplary side emitting chip configurations for a LED-based light source having reflecting zones and focusing optics to maximize directional intensity and to converge the emitted light to a single point. FIG. 2(a) shows an LED 200 including a rotated side emitting chip 201 together with a double cone tube 202 having exit surface 203, as well as angular reflecting surfaces 204 to maximize directional intensity. Side emitting captures light directly, with less reflections thereby making the transmission of light more efficient.

FIG. 2(b) shows a side view of LED 210 comprising a rotated side emitting chip 211 together with a tube 212 having reflecting surfaces 214 and a hybrid exiting surface 213. The hybrid exiting surface 213 includes an inner spherical focusing element 216 and an outer parabolic focusing elements 217 and 218. Both the spherical 216 and parabolic focusing element 217 and 218 are configured to focus emitted light to the same focal point. FIG. 2(c) shows a top view of the light source shown in FIG. 2(b).

Figure 3A:
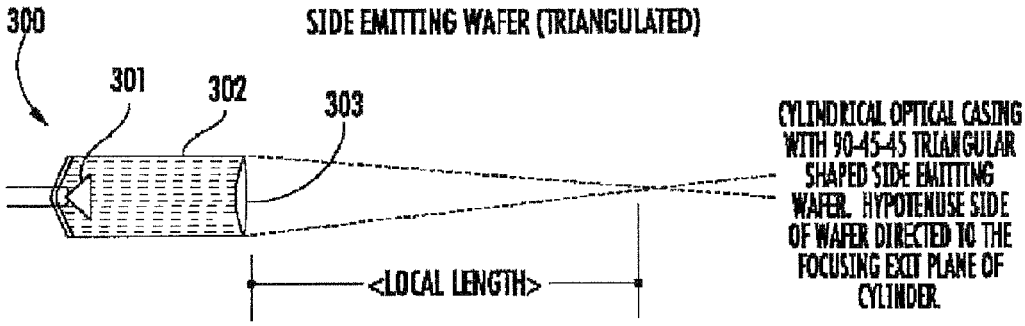
FIGS. 3(a)-(c) show various exemplary side emitting chip configurations for the light sources having various reflecting surface shapes and a focusing exit plane.
Figure 3B:
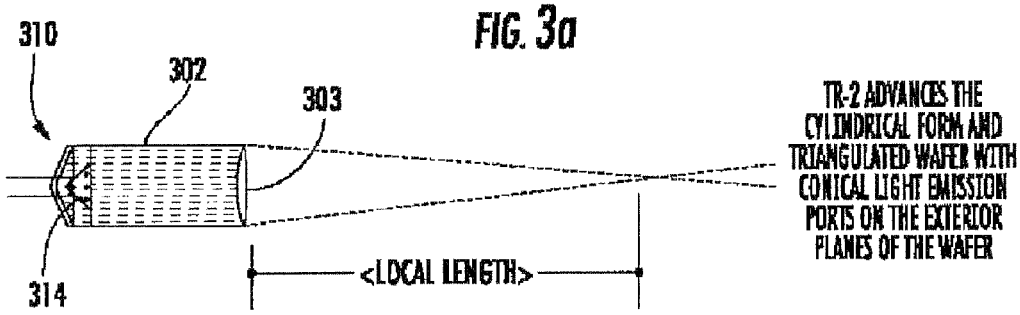
Figure 3C:
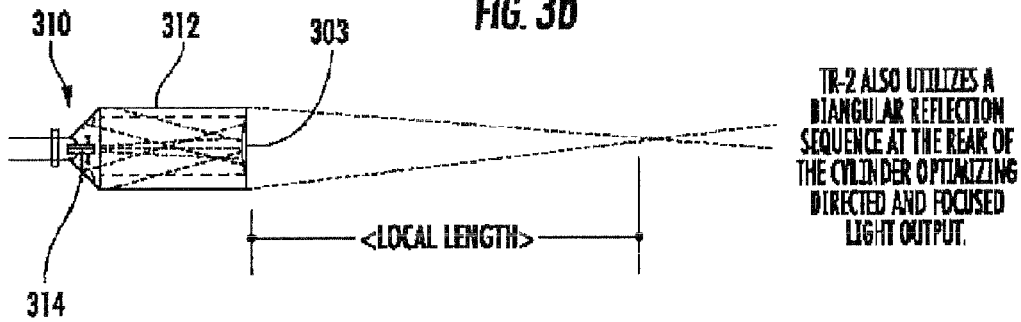

FIG. 3(a) shows an LED 300 comprising a cylindrical optical casing 302 together with a 90°-45°-45° triangular side emitting LED chip 301. The hypotenuse side of the chip is directed toward the focusing exit plane 303 of the cylindrical tube 302. The focusing exit plane 303 converges the light to essentially a single point a focal distance away from the exit plane. FIG. 3(b) shows LED 310 which incorporates conical holes 314 in the sides of the triangle shaped chip 311 that allows light to escape laterally, through these holes, from the emitting layer of the chip 311. This "lattice" effect on LED dies is generally referred to as "flip" technology. Reflecting surfaces are also preferably added to the tube 302 to direct the side emitted light to the focusing surface of the tube. FIG. 3(c) is a side view of the LED light source shown in FIG. 3(b).

Figure 4:
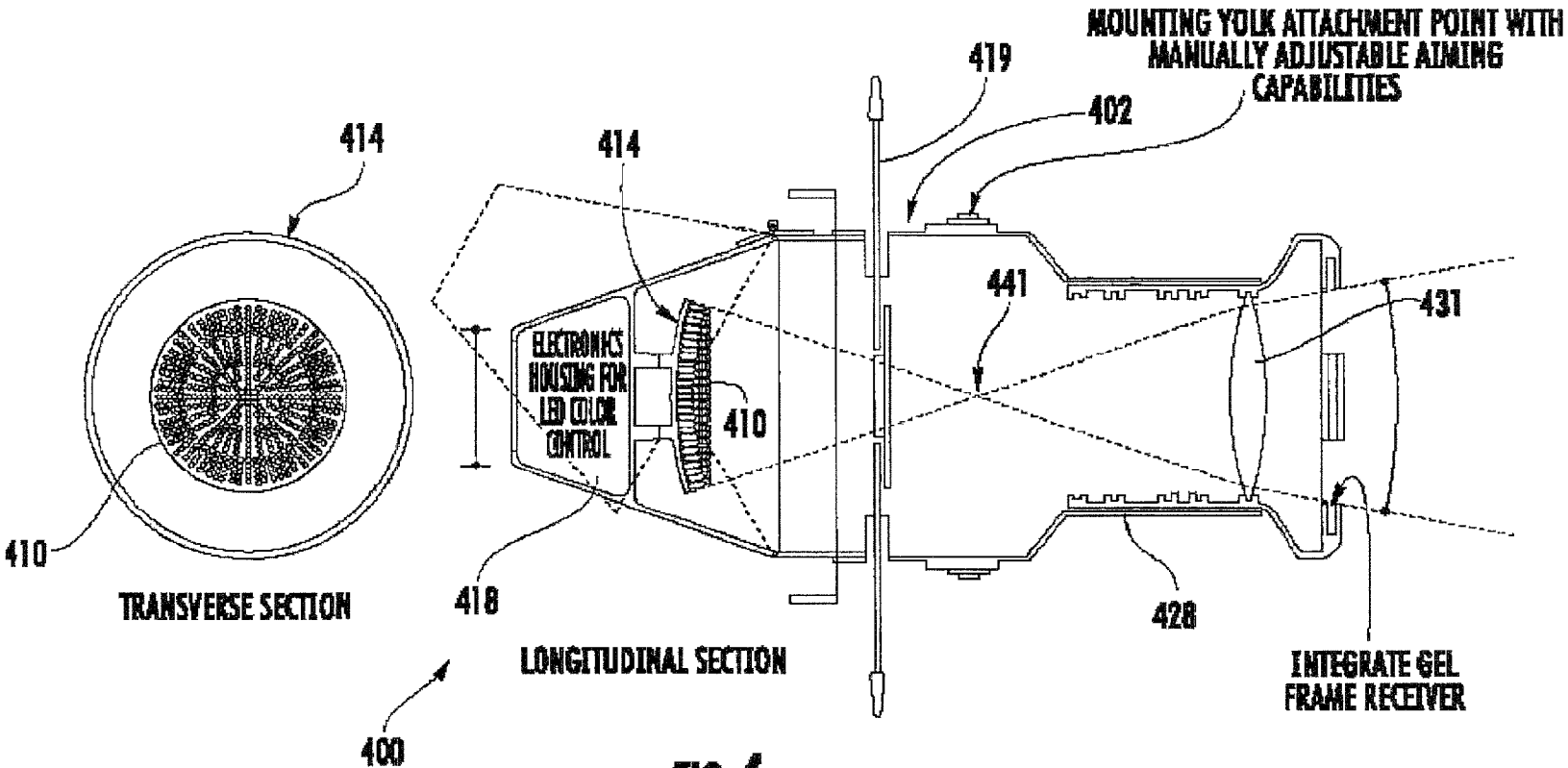
FIG. 4 shows an LED spotlight comprising an array of LED sources having integrated optics according to the invention.

FIG. 4 shows a high intensity laser or LED based lighting apparatus 400, suitable for use as a spotlight along with exemplary dimensions (in inches). The apparatus includes a housing 402 and an array of light emitting LED elements 410 according to the invention therein, with each of the light sources include a tube having a concave shaped exit surface on an end of the tube opposite the chip for converging light emitted to a focal point. (See, for example, LED light source 110 shown in FIG. 1(b)). The LED array 410 is shown mounted on a cast aluminum support disk 414. A shape of the curved support disk 414 converges the respective focal points into a light beam having a common focal plane 441. Electronics 418 are provided for color control. An adjustable shutter 419 for beam cut-off is also provided. Apparatus 400 also includes a lensing element 431 on its distal end mounted on an adjustable sliding lens tube 428 for beam focus adjustment. The sliding lens tube 428 can be a tube within a tube that slides on a polytetrafluoroethylene tracking device, commonly used in theatrical spotlights. Appropriate lenses 431 of either plano/convex, or convex/convex can be used as required. In the preferred embodiment shown in FIG. 4, lens tube provides structure so that lensing element 431 can be removed and changed.

The elements comprising the LED array 410 are preferably symmetrically disposed, meaning that the distance between any two adjacent light sources, is the same for any two adjacent light sources. This helps to give a predicable result during the convergence or divergence.

The LED array elements arrays are preferably held snap-in-place modules, providing flexibility to the user. The electronics 418 can combine various ratios of color emitting light sources to achieve a desired beam characteristic. In one embodiment, a white light output is achieved, and relative output intensity matching for monochrome arrays is provided.

The support disk 414 preferably provides concave geometry, a slope of the concave geometry concentrating light emitted from said plurality of light sources. In one embodiment, the support disk 414 is a malleable armature that flexes to change a beam spread of the array.

The light emitted from the apparatus can be controlled by electronics 418 using known methods including standard DMX protocols for any color control and motorized focusing. By communicating in DMX, illuminators can be programmed to change colors, turn on and off, dim, flash, etc. Third-party control systems can be used for preprogrammed and live control of illuminators, and these can be interconnected with MIDI systems, infrared remote controls, LCD touchpads, sliders, and a variety of sensors, to name a few.

DMX control systems use channels to address specific controllable aspects of equipment, i.e., designated pathways to send digital instructions to a particular component. Though it only has three wires, DMX is capable of addressing 512 separate channels. Each channel can be adjusted from 0 to 100, much like a slider dimmer adjusts the voltage from 0 to 100 percent.

For color mixing between adjacent frames, the wheel can be set halfway between two frames. Or two color wheels in line can mix to form an abundance of different colors.

There is a limit to the speed at which the stepper motor can execute commands, but it is quite fast. The color wheel can make a complete revolution through all its colors in approximately one-tenth of a second. This effect is so fast that the intermediary frames are unnoticeable, only the starting and ending frames are perceived.

Sophisticated color changing LED systems can be remotely controlled via electronic signals to transition between colors in the visible spectrum, thus eliminating the need for gel or dichroic filters that reduce light output and concentrate heat in the lamp. Another plug-in-place illuminator option would be an assigned color producing indigo or magenta or amber light, thus maintaining the no-filter color capabilities but at reduced cost for the illuminator and control system.

Alternatively, in the simplest form, white light LED illuminators can be used to produce a full spectrum "white" or filtered with gel or dichroic inserts. Installation of the fixtures and operation of the fixture will use traditional technologies familiar to all technicians in the industry eliminating the need for specialized training for application. The color changing systems can use existing (but relatively new) DMX control technologies that are prevalent in the industry.

One of the important design restraints found while designing lighting instruments is the removal of heat generated by the light source. High intensity light emitting diodes (LEDs) have a critical upper temperature operating limit. This can easily be exceeded when the LEDs are arranged in-groups and the ambient air temperature rises. In one embodiment of the present invention this problem is solved by ventilation holes placed through the housing 402. Ventilation holes are strategically placed in the housing to provide airflow either by a forced air system or by convection and to assist in dissipation of unwanted heat that is generated by the light sources and increase the life of the light sources. In one embodiment, housing 402 comprises a flexible material capable of provided the necessary flexibility and strength required. Exemplary flexible materials include vulcanized rubber, composite petroleum based plastic, or an elastomer.

The invention may be used for flashlights, theatrical lighting, and may have other applications including automobile headlights. Theatrical lighting is used in concerts, special events, nightclubs, television studios, restaurants and theme parks. Theatrical fixtures according to the invention could become the standard fixture for theater and dramatic lighting installations. It could be used in permanent installations and portable stage and lighting systems including traveling shows and pop and rock music shows. The fixtures can be used in architectural installations where precise lighting control is needed and low heat output is desirable such as museums, auditoria, lobbies, stages, churches etc.

Although generally shown as having the same focal length, the individual light sources need not have the same focal length, nor be focused to a single point. This enables the formation of a projected three-dimensional image. Three dimensional images can be used for special theatrical effects.

Alternatively, this embodiment may provide some medical applications, such as regarding treatment of tumors. An image of a tumor to be treated can be first provided a 3D rendering device, such as an MRI. Once the image is rendered, a nominal distance and alignment between the array and the tumor is fixed for the procedure. The light source is then shaped in 3D to match the tumor by selecting appropriate focusing optics for each light source and by manipulating the angular and axial position of the maleable backing under the individual light sources thus synchronizing the light produced to the tumor location and shape. The array of focused and computer controlled lasers using the computer 3D image could be used to very precisely remove the tumor three dimensionally without disturbing any tissue beyond the tumor.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A high intensity lighting apparatus, comprising:

an outer housing;

a curved support disk having an array of diode or laser-based integrated light sources attached thereto disposed within said housing, each of said light sources including a solid tube having a laser or diode chip at one end of said tube, said tubes each having at least one concave shaped exit surface on an end of said tube opposite said chip, said concave exit surface converging light emitted from each of said light source to focal points within said housing, a shape of said curved support disk converging respective ones of said focal points into a light beam having a common focal plane, and adjustable secondary optics disposed in said housing after said focal plane for creating various angles of transmission of said light beam.

2. The lighting apparatus of claim 1, wherein said focal plane is concentrated to substantially a single common focal point.

3. The lighting apparatus of claim 1, further comprising a highly reflective surface coating [an inside of] *on* said tubes excluding said exit surface*, wherein said reflective surface coating reflects light inside of said tube*.

4. The lighting apparatus of claim 1, wherein said chip is a side emitting chip mounted in a rotated configuration in said tube.

5. The lighting apparatus of claim 1, wherein said chip is triangular shaped and side emitting.

6. The lighting apparatus of claim 1, wherein said chip has ports for allowing light to escape from various points on a side of said chip.

7. The lighting apparatus of claim 1, wherein said exit surface provides at least two different focusing planes.

8. The lighting apparatus of claim 1, wherein said support disk is a malleable armature that flexes to change a beam spread of said array.

9. The lighting apparatus of claim 1, wherein said array of light sources is removably coupled to said support [disc] *disk*.

*10. A high intensity lighting apparatus, comprising:*

*an outer housing;*

*an array of diode or laser-based integrated light sources disposed within said housing, each of said light sources including a solid tube having a laser or diode chip at one end of said tube, said tubes each having at least one concave shaped exit surface on an end of said tube opposite said chip; and*

*secondary optics disposed in said housing.*

*11. The lighting apparatus of claim 10, wherein said concave exit surface converges light emitted from each of said light source to focal points within said housing.*

*12. The lighting apparatus of claim 11, wherein said exit surface provides at least two different focusing planes.*

*13. The lighting apparatus of claim 10, wherein the secondary optics disposed in said housing comprise a lensing element mounted on an adjustable sliding lens tube for beam focus adjustment.*

*14. The lighting apparatus of claim 10, further comprising a reflective surface coating on said tubes excluding said exit surface, wherein said reflective surface coating reflects light inside of said tube.*

*15. A high intensity lighting apparatus, comprising:*

*a light source including a solid tube having a laser or diode chip at one end of said tube, said tube having at least one concave shaped exit surface on an end of said tube opposite said chip, and a reflective surface coating on said tube excluding said exit surface, wherein said reflective surface coating reflects light inside of said tube.*

*16. The lighting apparatus of claim 15, wherein said chip is a side emitting chip mounted in a rotated configuration in said tube.*

*17. The lighting apparatus of claim 15, wherein said chip is triangular shaped and side emitting.*

*18. The lighting apparatus of claim 15, wherein said chip has ports for allowing light to escape from various points on a side of said chip.*

*19. The lighting apparatus of claim 15, wherein said exit surface provides at least two different focusing planes.*

* * * * *